United States Patent Office 3,022,122
Patented Feb. 20, 1962

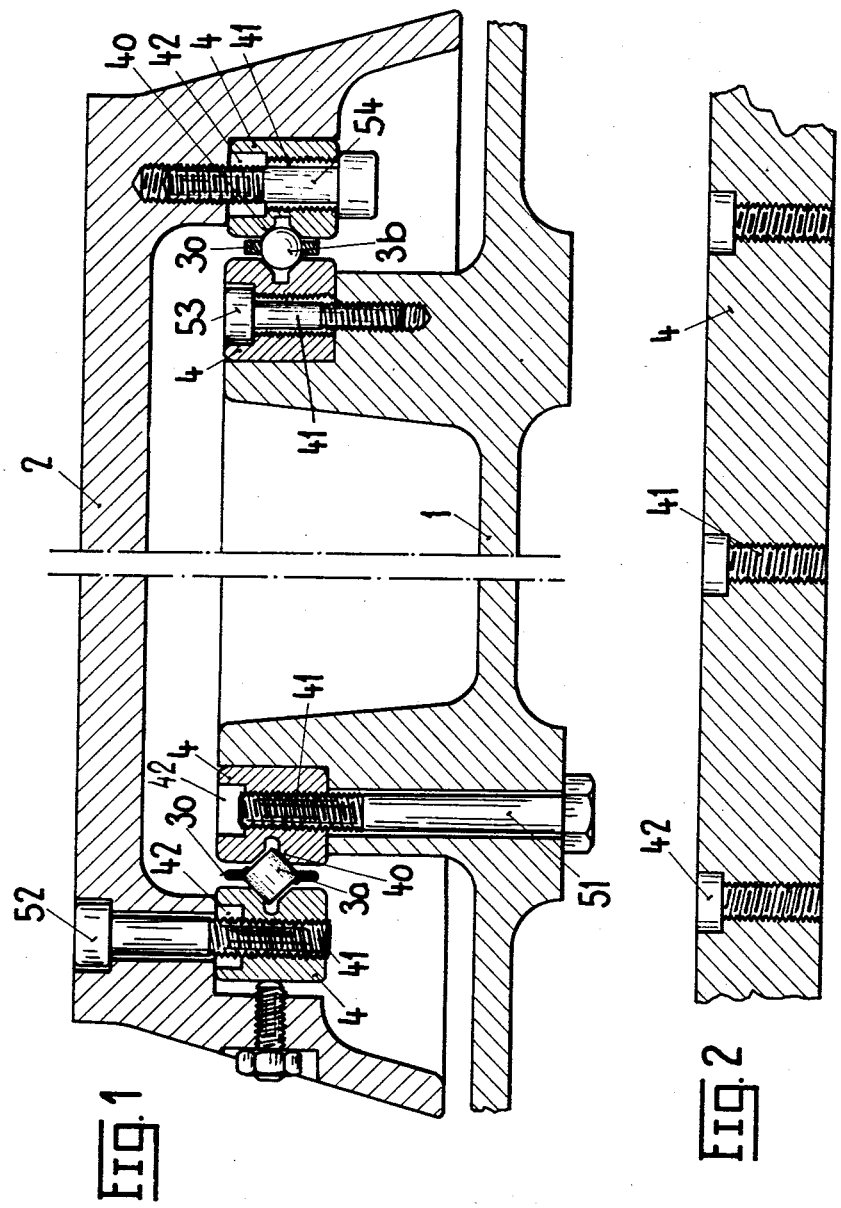

3,022,122
CARRIAGE GUIDE FOR MUTUALLY LONGITUDINALLY MOVABLE MACHINE COMPONENTS
Ernst Pfister, Roggwil, Switzerland
Filed Jan. 28, 1960, Ser. No. 5,242
Claims priority, application Switzerland Dec. 3, 1959
2 Claims. (Cl. 308—6)

The present invention relates to carriage guides for mutually longitudinally movable machine components, and has the primary object of providing a carriage guide the principal guide members of which are standardised and readily interchangeable.

It is another object of the invention to provide a carriage guide as aforesaid wherein the principal guide members are capable of being attached to the said machine components by various conventional means, such as bolts and screws without impairing their interchangeability.

It is yet another object of the invention to provide a carriage guide as aforesaid which combines low friction with accurate location of the mutually movable machine components.

With these and other objects in view which will become apparent later from this specification and the accompanying drawing, I provide a carriage guide comprising in combination: two mutually longitudinally movable components, identical guide rails of prismatic shape fitted into the said components in juxtaposition with one another, each of the said guide rails being provided with a longitudinal V-groove on the side face opposite that of a guide rail fitted to the other said component, and anti-friction bodies in rolling contact with and accurately spacing the V-groove in two opposite guide rails.

Preferably each guide rail is provided with a row of tapped holes parallel to its face having the said V-groove, said holes having the same diameter, screw-thread and spacing from one another in all said guide rails. If these tapped holes are counterbored at one end to accommodate the heads of screws therein, this is done in such a manner, that the grooved bored, tapped and counter-bored guide rails remain identical and interchangeable, and are not "handed" by the counter-boring.

The said guide rails may be fixed to the said machine components either by screw bolts passing from outside with clearance through holes in the said machine components and screwed into said tapped holes of the said guide rails, or by means of screws passing with clearance through said tapped holes and screwed into tapped bores of the said machine components.

These and other features of my said inveniton will be clearly understood from the following description of an embodiment thereof given by way of example with reference to the accompanying drawing, in which:

FIG. 1 is a transverse section of a carriage guide according to the invention, some of its details being modified on the right hand side of this figure as compared with those on the left hand side of it.

FIG. 2 is a longitudinal section of one of the guide rails of FIG. 1.

On one component, 1, which may be the stationary bed of the machine, a carriage 2 is mounted movably in a direction perpendicular to the plane of FIG. 1. Guide rails 4, all of which are preferably identical are fitted in parallel juxtaposition to the bed 1 and the carriage 2. These guide rails 4 have at one side face a V-shaped longitudinal recess, the flanks 40 of which include an angle of 90° with one another, and of 45° to their associated side face. Rollers 3a (left hand side of FIG. 1) or alternatively balls 3b (right hand side of FIG. 1) guided in cages 30 effect an accurate anti-friction guidance between the rails 4 of the bed 1 and the carriage 2, respectively.

These guide rails are provided with screw-tapped bores 41, counter-bored at one end at 42. They allow the fixing of these guide rails 4 to the bed 1 and carriage 2 either by screws 51, 52, respectively, penetrating from outside through bores of said bed 1 and carriage 2, respectively, into said tapped bores 41 (left hand side of FIG. 1), or by screws 54 passing through the said tapped bores 41 with clearance and screwed into blind tapped holes of the bed 1 and carriage 2, respectively. The cheese head 53 of one of these screws is shown in the right hand side of FIG. 1 to be embedded with clearance in the counter bore of a bore 41.

The present invention combines low friction and accuracy of the guidance of the carriage 2 on the stationary bed 1, with great simplicity and versatility, identical guide rails 4 may be used for both the bed 1 and the carriage 2. These guide rails may be standardised in their dimensions and as regards diameter, screw thread and spacing of their bores. They may be set into appropriate recesses so as to rest on two mutually perpendicular shoulders thereof, or, as shown on the left hand side of FIG. 1 for the guide rail inserted into the carriage 2, they may rest on one shoulder face only and be located by lateral screws from the side of the other shoulder face, before the associated screw 52 is tightened. Rollers or balls may be used at will for antifriction guidance in the V-grooves 40 of the rails 4. Different sorts of screws may be used as shown on the left hand side and on the right hand side of FIG. 1.

While I have described herein and illustrated in the accompanying drawing what may be considered a typical and particularly useful embodiment of my said invention I wish it to be understood that I do not limit myself to the particular details and dimensions described and illustrated; for obvious modifications will occur to a person skilled in the art.

What I claim as my invention and desire to secure by Letters Patent is:

1. Carriage guide for two mutually slidable machine components with identical prismatic guide rails which comprise V-shaped grooves in the flanks facing each other to receive roller bearings or ball bearings between the rails, and which comprise threaded apertures passing through said prismatic guide rails from one side of the prism abutting the bearing side to the other, said apertures being enlarged at one end to form recesses for receiving the heads of bolts.

2. A prismatic rail adapted for rolling on bearings of a carriage guide, comprising V-grooves in one bearing surface to receive roller or ball bearings, fastening apertures for said rail which pass through the rail from one prism side abutting the bearing surface to the other, said apertures being provided with internal threads and at one end with enlargements to receive the head of a bolt in each of the enlargements, the dimension of each of the enlargements being adapted to the head of a tap bolt whose shaft just passes through the threaded aperture.

References Cited in the file of this patent
UNITED STATES PATENTS

| | | |
|---|---|---|
| 2,400,374 | Selnes | May 14, 1946 |
| 2,672,378 | McVey | Mar. 16, 1954 |
| 2,721,776 | Ruist | Oct. 25, 1955 |